(12) United States Patent
Eberstein et al.

(10) Patent No.: US 12,097,574 B2
(45) Date of Patent: Sep. 24, 2024

(54) SENSOR DEVICE AND METHOD FOR PRODUCING A SENSOR DEVICE

(71) Applicant: TDK Electronics AG, Munich (DE)

(72) Inventors: Markus Eberstein, Berlin (DE); Jörn Bonse, Berlin (DE); Sabrina V. Kirner, Berlin (DE)

(73) Assignee: TDK Electronics AG, Munich (DE)

( * ) Notice: Subject to any disclaimer, the term of this patent is extended or adjusted under 35 U.S.C. 154(b) by 436 days.

(21) Appl. No.: 17/292,875

(22) PCT Filed: Nov. 18, 2019

(86) PCT No.: PCT/EP2019/081643
§ 371 (c)(1),
(2) Date: May 11, 2021

(87) PCT Pub. No.: WO2020/104370
PCT Pub. Date: May 28, 2020

(65) Prior Publication Data
US 2021/0402522 A1    Dec. 30, 2021

(30) Foreign Application Priority Data

Nov. 19, 2018 (DE) .......................... 102018129058.6

(51) Int. Cl.
*B23K 26/362* (2014.01)
*B23K 26/0622* (2014.01)
*G01L 19/06* (2006.01)

(52) U.S. Cl.
CPC ........ *B23K 26/362* (2013.01); *B23K 26/0624* (2015.10); *G01L 19/0654* (2013.01)

(58) Field of Classification Search
CPC .............. B23K 26/362; B23K 26/0624; G01L 19/0654
See application file for complete search history.

(56) References Cited

U.S. PATENT DOCUMENTS

| 6,435,025 B1 * | 8/2002 | Krause ................. G01F 23/268 73/304 C |
| 6,941,814 B2 | 9/2005 | Hegner et al. |
| 2006/0288774 A1 | 12/2006 | Jacob et al. |

(Continued)

FOREIGN PATENT DOCUMENTS

| DE | 10163567 A1 | 7/2003 | |
| DE | 10334238 A1 * | 2/2005 | ......... G01L 19/0654 |

(Continued)

OTHER PUBLICATIONS

[NPL-1] Ciaston et al. (DE 102014211856 A1); Dec. 24, 2015 (EPO—machine translation to English). (Year: 2015).*

(Continued)

*Primary Examiner* — David Sample
*Assistant Examiner* — Donald M Flores, Jr.
(74) *Attorney, Agent, or Firm* — Slater Matsil, LLP (57) ABSTRACT

In an embodiment a sensor device includes a sensor element, a media supply configured to transport a medium to the sensor element and a surface, wherein the surface is configured to be exposed to the medium during operation of the sensor device, and wherein the surface comprises a surface structure configured to reduce a wettability of the surface by the medium.

19 Claims, 3 Drawing Sheets

(56) References Cited

U.S. PATENT DOCUMENTS

| | | | |
|---|---|---|---|
| 2007/0209425 A1 | 9/2007 | Shibata et al. |
| 2008/0060440 A1 | 3/2008 | Toyoda |
| 2011/0086204 A1 | 4/2011 | Wohl, Jr. et al. |
| 2012/0240683 A1 | 9/2012 | Ooya |
| 2014/0061892 A1 | 3/2014 | Ziglioli et al. |
| 2017/0176311 A1 | 6/2017 | Kota et al. |
| 2020/0255285 A1 | 8/2020 | Doering et al. |

FOREIGN PATENT DOCUMENTS

| | | | |
|---|---|---|---|
| DE | 102008026611 A1 * | 12/2009 | ......... G01L 19/0038 |
| DE | 102014211856 A1 * | 12/2015 | ......... C23C 14/0605 |
| DE | 102014223984 A1 | 5/2016 | |
| DE | 102017211451 A1 | 1/2019 | |
| WO | 0214804 A1 | 2/2002 | |

OTHER PUBLICATIONS

[NPL-2] Recknagel et al. (DE 10334238 A1); Feb. 24, 2005 (EPO—machine translation to English). (Year: 2005).*

[NPL-3] Braun et al. (DE 102008026611 A1); Dec. 31, 2009 (EPO—machine translation to English). (Year: 2009).*

[NPL-4] A. Aguilar-Morales, S. Almri, A. Lasagni, Micro-fabrication of high aspect ratio periodic structures on stainless steel by picosecond direct laser interference patterning:; Journal of Materials Processing Tech. 252 (2018), pp. 313-321 (available online Sep. 28, 2017). (Year: 2017).*

Aguilar-Morales et al., "Micro-fabrication, of high aspect ratio periodic structures on stainless steel by picosecond direct laser interference patterning," Journal of Materials Processing Tech., 252 (2018), 313-321, Total 9 pages.

Sedai et al., "Development of superhydrophobicity in fluorosilane-treated, diatomaceous earth polymer coatings," Applied Surface Science, vol. 386, Nov. 15, 2016, pp. 178-186, Total 10 pages.

Hermens et al., "Mimicking lizard-like, surface structures upon ultrashort laser pulse irradiation of inorganic materials," Applied Surface Science, 418 (2017), pp. 499-507, Total 2 pages.

Kam et al., "Control of the wetting, properties of an AISI 316L stainless steel surface by femtosecond laser-induced surface modification," IOP Publishing, J. Micromech. Microeng., 22 (2012), 105019, Total 7 pages.

* cited by examiner

| # | E (μJ) | $\Phi_0$ (J/cm²) | V (mm/s) | N | α (°) |
|---|---|---|---|---|---|
| 1 | 118 | 2.0 | 15 | 8 | 113 |
| 2 | 30 | 0.5 | 3.1 | 40 | 39.5 |
| 3 | 61 | 1 | 3.1 | 40 | 9 |
| 4 | 91 | 1.5 | 3.1 | 40 | 7 |
| 5 | 15 | 0.25 | 3.1 | 40 | 111 |
| 6 | 30 | 0.5 | 2.07 | 60 | 44 |
| 7 | 121 | 2.0 | 6.2 | 20 | 7 |
| 8 | 61 | 1.0 | 6.2 | 20 | 38 |
| 9 | 30 | 0.5 | 6.2 | 20 | 61 |

FIG 3B

SENSOR DEVICE AND METHOD FOR PRODUCING A SENSOR DEVICE

This patent application is a national phase filing under section 371 of PCT/EP2019/081643, filed Nov. 18, 2019, which claims the priority of German patent application 10 2018 129 058.6, filed Nov. 19, 2018, each of which is incorporated herein by reference in its entirety.

TECHNICAL FIELD

A sensor device and a method for producing a sensor device are provided.

BACKGROUND

Sensors may be exposed to varying environmental conditions, and in particular very different temperatures, depending on the place of use. At excessively low temperatures, media which come in contact with the sensors may condense and even freeze. In a motor vehicle, for example, after use of the vehicle at least residues of the exhaust gas may remain in a sensor in the exhaust gas system and condense and even freeze there in the event of correspondingly low external temperatures because of the moisture content in the exhaust gas. Since the condensate may adhere to sensitive functional elements of the sensor and exert uncontrolled forces when solidifying to form ice, the measurement signal of the sensor may be vitiated immediately after the next start of the motor vehicle or, in extreme cold, even when driving. For example, this phenomenon may occur in the case of pressure sensors which detect the pressure of a gaseous or liquid medium by means of the deformation of a thin membrane for media separation. If the condensate ices in the sensor as described, long waiting times may occur before the medium in the sensor has diced, for example by heat given off by the engine. The measurement accuracy of pressure sensors correspondingly decreases greatly at low temperatures, and the measurement signal may exhibit errors so great that misdiagnoses occur. Since the sensor may constitute a dead end for the medium and be the coldest point in the system, accumulation of condensate in the sensor may also occur to such an extent that there is excessive stress on the sensor, which may even lead to premature destruction.

However, because of increased requirements for emission control, in the case of gasoline and diesel engines pressure measurements on the exhaust gas system are required directly after the engine cold start. The time until the sensor must deliver a measurement signal is therefore shortened considerably. Dicing merely by engine heat given off is therefore no longer sufficient. In order to avoid this problem, it is possible, for example, not to carry out measurements at excessively low temperatures but to control the engine with the aid of stored characteristics. Only when particular positive temperatures are reached is the sensor signal evaluated. The operation of the sensor therefore takes place only in a particular temperature window. Attempts may furthermore be made to place the sensor at favourable positions in the engine compartment, for example in the vicinity of the cooling water entry into the radiator. In this way, however, the heating is still dependent on the engine heat given off. Independent heating of the sensor, however, leads to increased energy consumption. At least partial avoidance of adhesion of condensate to media-carrying sensor parts by a surface coating of hydrophobic materials, for example fluorosilanes, is furthermore possible. However, these materials are of an organic nature and, for example compared to stainless steel, have reduced corrosion resistance under the effect of temperature and aggressive media, for example an exhaust gas condensate.

SUMMARY

Embodiments provide a sensor device with which the problems described above can be reduced or prevented. Further embodiments provide a method for producing a sensor device.

According to at least one embodiment, a sensor device comprises a sensor element. The sensor element may in particular be the active part of the sensor device, i.e. the part by which the measurement is carried out. In particular, the sensor device may be provided and adapted to measure at least one property of a medium. The medium may preferably comprise or be a gas or a mixture of gases. The medium may also comprise vapor and/or droplets of a liquid, for example moisture, i.e. water vapor and/or water droplets. Furthermore, the medium may also contain particles, in particular soot. The medium may, for example, be air or an exhaust gas or a mixture thereof.

A property to be measured by the sensor device may particularly preferably be a pressure, so that the sensor device may be configured as a pressure sensor. The sensor element may in this case, for example, be a pressure sensor chip which comprises a membrane that is exposed to the medium during operation. The membrane may deform to different extents depending on the pressure of the medium on one side of the membrane in comparison with a pressure on the other side of the membrane. By measuring the membrane deformation, it may be possible to determine information relating to the pressure of the medium. Furthermore, a property to be measured by the sensor device may for example also be a temperature, so that in addition or as an alternative the sensor device may also be configured as a temperature sensor. The sensor element may in this case, for example, comprise or be a thermistor. Furthermore, the sensor device may also be adapted and provided to measure one or more optical properties of the medium. The sensor element may in this case for example comprise light-generating and/or light-detecting elements, for example in the form of one or more diodes. The sensor device may also comprise a multiplicity of sensor elements, which may for example be selected from the sensor elements described so that the sensor device may be used to measure a plurality of parameters of the medium.

According to a further embodiment, the sensor device comprises a media supply, by means of which the medium is transported to the sensor element at least during operation of the sensor device. The media supply may for example comprise or be a channel, a conduit and/or a storage volume, through which the medium is transported and/or in which the medium at least temporarily remains. In the case of a pressure sensor, the sensor device may for example comprise a conduit, for instance a connecting piece, which is connected to the volume in which the medium is located. If the medium comprises or is an exhaust gas of a motor vehicle, for example, the sensor device may be connected by the connecting piece to the exhaust gas system of the motor vehicle so that exhaust gas can reach the sensor element.

According to a further embodiment, the sensor device comprises at least one surface having a surface structure which reduces a wettability of the surface. The term "surface" includes both an entire surface and a part of a surface. The following description therefore applies equally for an entire surface and for a surface region. In particular, the surface with the surface structure is a surface of the sensor device which is exposed during operation of the sensor device to the medium for which at least one parameter is intended to be determined by means of the sensor device. The wettability reduced by the surface structure may particularly preferably be the wettability of the surface in relation to the medium or at least one component of the medium, i.e. in particular for example in relation to condensing constituents of the medium. The medium or the at least one component of the medium, to which the wettability relates, may be in liquid form, for example in the form of droplets, or may also condense upon contact with the surface. For example, the component of the medium to which the property of wettability of the surface relates may be water, which may be contained in the gaseous medium in the form of moisture, i.e. water vapor and/or droplets.

The surface with the surface structure may, in particular, be free of a coating that reduces the wetting. In other words, the surface may be free of a material which has a lower wettability in comparison with the uncoated surface. Here and in what follows, unless otherwise described, a coating refers to a material deliberately applied in the form of a partially or completely covering layer in the scope of the production of the sensor device. Material impurities on the surface, which are applied or deposited on the surface accidentally or unavoidably during production or operation, are not included by the term coating. Such a coating, not present on the surface with the surface structure in the present sensor device, could for example be a fluoropolymer, for example Teflon, or a fluorosilane, which are known as a water-repellent coating. The surface with the surface structure may therefore in particular be a surface of a part or of a component of the sensor device which has a higher wettability without the surface structure. The material of the surface with the surface structure may therefore, in particular, be the material of the corresponding part or of the corresponding component of the sensor device and may, depending on the material from which the part or the component of the sensor device having the surface with the surface structure is made, comprise or be for example a semiconductor material, a metal or a metal alloy, a plastic, a ceramic material or combinations comprising these. Correspondingly, the surface with the surface structure may for example be at least partially a metal surface, in the case in which the part or the component of the sensor device which comprises the surface with the surface structure comprises or consists of a metal or a metal alloy. If the surface of the sensor device with the surface structure extends over a plurality of parts or components comprising or consisting of different materials, the surface with the surface structure may correspondingly also comprise different materials.

For example, the surface with the surface structure may be a surface of the sensor element. If the sensor element is configured as a pressure sensor element, for instance a pressure sensor chip, the surface with the surface structure may particularly preferably be part of the membrane. In particular, this may preferably be the entire part of the surface of the sensor element, and therefore in particular of the membrane, which is in contact with the medium during operation of the sensor device. If the sensor element is for example a silicon-based chip, the surface with the surface structure may comprise or consist of silicon or an oxide or nitride of silicon. In the case of a ceramic or metal membrane, the surface with the surface structure may correspondingly comprise or consist of a ceramic or metallic material. The same applies for other types of sensor elements.

As an alternative or in addition, the surface with the surface structure may be at least part of the media supply. For example, the surface with the surface structure may be at least a part of a channel, for instance of a connecting piece, of a conduit and/or of a storage volume for the medium. Depending on the material or materials of the part of the sensor device which forms the media supply, the surface with the surface structure may comprise or consist of precisely this material or precisely these materials.

Particularly preferably, the entire surface of the sensor device which is exposed to the medium during operation of the sensor device may comprise a surface structure. Correspondingly, the wettability of the entire surface of the sensor device which comes in contact with the medium during operation may be reduced because of the surface structure.

In particular, the surface with the surface structure may be hydrophobic or superhydrophobic caused by the surface structure. This may particularly preferably mean that the contact angle between water and the surface with the surface structure is greater than or equal to 110° or even greater than or equal to 135° or even greater than or equal to 150°. In particular, the hydrophobic or superhydrophobic effect of the surface may be caused only by the surface structure, without, as described above, an additional hydrophobic coating being present.

According to a further embodiment, the surface structure comprises a microstructure. The microstructure may, in particular, comprise a multiplicity of elevations and/or depressions which have characteristic sizes in the range of greater than or equal to 0.1 µm and less than or equal to 500 µm. Characteristic sizes of the elevations and depressions may, for example, be selected from: height, length, width, diameter, depth, maximum extent length, spacing, in particular quasiperiodic spacing.

The microstructure may, for example, comprise elevations and/or depressions having circular and/or elongate cross sections. In particular, the microstructure may comprise circular and/or elliptical elevations and/or depressions, i.e. hole-like depressions and/or hill- or island-like elevations, which may for example be columnar, cylindrical and/or conical in shape. The microstructure may furthermore comprise elongate, branching or non-branching ridges and/or trenches extending along the surface, which may intersect or not intersect or be parallel. The elevations and/or depressions may at least partially or all be shaped and/or arranged periodically and therefore regularly, or also at least partially or all be shaped and/or arranged irregularly.

According to a further embodiment, the elevations and/or depressions have a spacing of less than or equal to 500 µm. Furthermore, the elevations and/or depressions may have a spacing of greater than or equal to 0.1 µm or greater than or equal to 0.5 µm or greater than or equal to 1 µm. Furthermore, the elevations and/or depressions may have a spacing of less than or equal to 300 µm or less than or equal to 200 µm or less than or equal to 100 µm or less than or equal to 50 µm.

According to a further embodiment, the elevations and/or depressions have a height or depth of less than or equal to 250 µm. Furthermore, values of less than or equal to 200 µm or less than or equal to 150 µm or less than or equal to 100 µm or less than or equal to 50 µm and/or greater than or equal to 1 µm or greater than or equal to 5 µm or greater than or equal to 10 µm may also be possible.

According to a further embodiment, the surface structure comprises a nanostructure. The nanostructure may comprise a multiplicity of elevations and/or depressions which have characteristic sizes in the range of greater than or equal to 1 nm and less than or equal to 100 nm. The elevations and/or depressions of the nanostructure may have shapes as described in connection with the microstructure. Particularly preferably, the nanostructure may comprise circular and/or elliptical elevations and/or depressions, i.e. hole-like depressions and/or hill- or island-like elevations. The elevations and/or depressions may preferably have widths or diameters of greater than or equal to 1 nm or greater than or equal to 5 nm and/or less than or equal to 100 nm or less than or equal to 50 nm or less than or equal to 25 nm.

Furthermore, the surface structure may also comprise a combination of a microstructure and a nanostructure. In particular, the surface structure may comprise a hierarchical micro-nanostructure, i.e. a microstructure which is covered with a nanostructure. The surface structure therefore comprises for example a microstructure, i.e. elevations and/or depressions with a size corresponding to the description above, on the surfaces of which nanostructures are formed.

According to a further embodiment, in a method for producing a sensor device, the surface structure is produced by means of laser radiation, in particular by means of pulsed laser radiation. To this end, short-pulse laser irradiation or preferably ultrashort-pulse laser irradiation may be carried out, in particular by using a nanosecond laser, preferably a picosecond laser or particularly preferably a femtosecond laser. This may mean that the pulsed laser radiation comprises laser pulses with a pulse duration of less than or equal to 100 ns and preferably less than or equal to 100 fs or less than or equal to 50 fs or less than or equal to 30 fs.

Parameters of the laser radiation, for example selected from wavelength, energy, beam width, fluence, degree of polarization, forward advance rate, pulse frequency, pulse number, pulse duration, angle of incidence and scan conduit offset, may be adjusted depending on the material of the surface in which the surface structure is produced, in order to achieve a desired material ablation in order to generate the surface structure with the features described above. Focusing and interference techniques may furthermore be used in order to produce desired structure shapes and sizes. In this way, it may be possible to produce identical or different surface structures on different surfaces, i.e. surfaces of different materials. In particular, the production of the surface structure may take place in the scope of the conventional production process of the individual components of the sensor device. To this end, during or after the production of a part or of a component of the sensor device, the irradiation by means of pulsed laser radiation may be carried out as a method step inserted into the conventional production process. In particular, the laser irradiation may thereby be carried out within the conventional manufacturing conduit (in-line). By means of ultrashort-pulse laser irradiation, and therefore only by the laser process, it may therefore be possible for example to achieve a (super)hydrophobic functionalization for one or several or all surfaces of the sensor device which come in contact with the medium during operation of the sensor device, by generating microstructures, nanostructures or, particularly preferably, self-organized hierarchical micro-nanostructures, without additional coating with a (super)hydrophobic material being necessary. The self-organized hierarchical micro-nanostructures may be based on so-called Laser-Induced Periodic Surface Structures (LIPSS), i.e. ripples or grooves or cones/spikes.

By the method described here, it is possible to provide uniform icing resistance of different parts of the sensor device. In particular, for example in the case of a sensor device configured as a pressure sensor, such resistance may be achieved for selected or even all pressure sensor functional elements. In experiments, it has in particular been possible to show that, for a pressure sensor membrane treated according to the method described here, in a laboratory setup the deviation of the measurement signal due to iced adhering water drops is much less than for untreated reference membranes, and may in particular still vary within the specified error.

As described, potential undesired wetting of one or more or all surfaces with condensate of the medium in the sensor device may be reduced or even entirely prevented by the implementation of an additional laser-based process step during the production of the sensor device, since the surface structure produced can greatly reduce or even entirely prevent the accumulation of condensate on media-carrying surfaces, for example the media supply, and/or media-separating surfaces, for example a membrane. By the use of ultrashort-pulse lasers it is possible to generate a controlled material ablation on the micro and nano scale on different material surfaces with low thermal loading of the remaining material volume. The resulting surfaces may in this case, as described, comprise for example periodic or random microstructures and/or nanostructures, and in particular also hierarchical micro-nanostructures, the structure of which depends, besides the material, inter alia on the wavelength and the polarization of the laser pulses used, for instance ultrashort pulses. With the described method, it may therefore be possible to provide surface structures which in geometry and/or at least in principle resemble those of lotus leaves and exhibit a strongly water-repellent effect and therefore superhydrophobicity, which can lead to reduced icing. By the minimized adhesion of condensate during operation of the sensor device below a temperature of 0° C., the resulting ice volumes on the surfaces which are in contact with the medium may be negligibly small so that the sensor function and the measurement accuracy may be preserved even at such temperatures. Since water drops rolling off because of the reduced wettability of the surface can pick up extraneous particles and transport these with them, continuous self-cleaning of the surfaces which are in contact with the medium may furthermore be achieved, which is also known as the so-called lotus effect.

As described above, with the method described here it is possible to achieve a hydrophobic surface property merely by laser processing, for instance ultrashort-pulse laser processing, of the surfaces which are in contact with the medium, instead of addition of a functional material. This means that, without the use of additional coatings, the crucial and proven material properties for the original selection of the design material, for example resilient behavior as well as temperature behavior and corrosion behavior, are substantially preserved. Compared to surface functionalization by an additional coating, the risk of separation of the coating is avoided, which allows longer lifetimes and an improved operating behavior to be expected.

With the method described here, it may therefore be possible that comparable hydrophobic surface properties can be achieved on different design materials and therefore preferably continuously in the entire media-carrying region of the sensor device, since the physical principle may be applied equally to organic materials and inorganic materials by varying the laser parameters. Because of the small thermal influence zone of a few hundred nanometers during the ultrashort-pulse laser irradiation, the process may also be suitable for very thin elements, for example pressure-sensitive membranes. Because of the very good focusability of laser radiation onto diameters down to the micrometer range, even very small functional elements of the surface structure with sizes in the range of a few micrometers or more, or even less, may be structured flexibly and rapidly. The ultrashort-pulse laser processing may be carried out in the production process, preferably in-line, and very rapidly by means of modern laser technology. As described above, it may furthermore be possible to achieve self-cleaning of the media-carrying region of the sensor device. In particular, multifunctionalization of a media-separating surface, for example a membrane of a pressure sensor element, may therefore be achieved in the form of pressure transmission, condensate repellency and self-cleaning.

BRIEF DESCRIPTION OF THE DRAWINGS

Further advantages, advantageous embodiments and refinements may be found in the exemplary embodiments described below in connection with the figures, in which.

In the exemplary embodiments and figures, elements which are the same or of the same type, or which have the same effect, may respectively be provided with the same references. The elements represented and their size proportions with respect to one another are not to be regarded as true to scale. Rather, individual elements, for example layers, component parts, components and regions, may be represented exaggeratedly large for better representability and/or for better understanding.

DETAILED DESCRIPTION OF ILLUSTRATIVE EMBODIMENTS

Figure 1A:
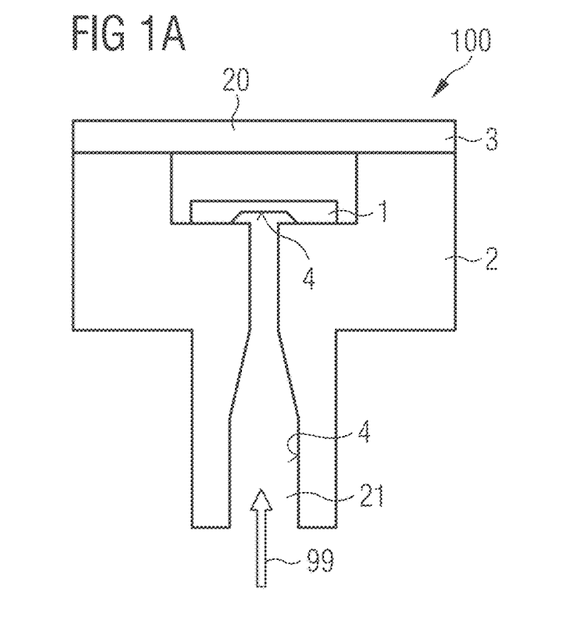
FIGS. 1A to 1C show schematic representations of a sensor device and of a method for producing the sensor device according to one exemplary embodiment.
Figure 1B:
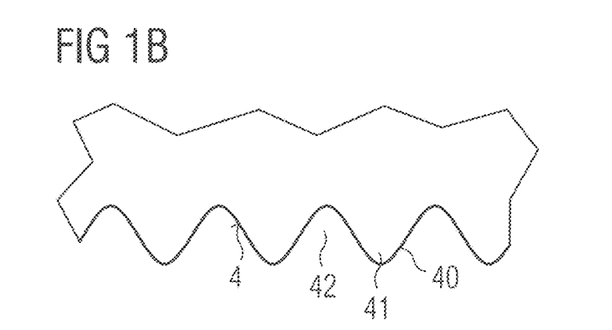
Figure 1C:
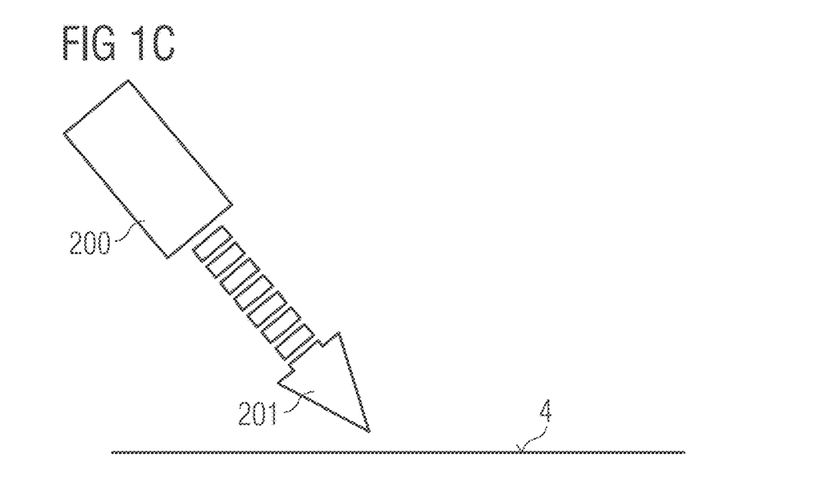

A sensor device 100 and a method for producing the sensor device 100 according to one exemplary embodiment are shown in FIGS. 1A to 1C. The sensor device 100 is, in particular, provided and adapted to measure one or more parameters of a medium 99, which may for example be selected from a pressure, a temperature and optical properties.

Purely by way of example, the sensor device 100 of the exemplary embodiment shown is a pressure sensor, which may for example be used in the scope of an exhaust gas measurement in a motor vehicle. Correspondingly, the medium 99 may purely by way of example comprise or be an exhaust gas of a gasoline or diesel engine. Furthermore, the medium 99 may also at least partially comprise air. This may, in particular, be the case at a time before the engine is started and/or shortly after starting of the engine. In particular, the medium 99 may also at least partially comprise moisture, which is for example contained in the air and/or in the exhaust gas, so that the possibility may arise that the medium 99 forms a condensate at low temperatures. Even though the description below relates to a particular configuration of the sensor device 100, it applies equally for other types of sensor, including in combination with other media.

As is shown in FIG. 1A, the sensor device 100 comprises a sensor element 1 which constitutes the active part of the sensor device 100. In the exemplary embodiment shown, the sensor element 1 is a pressure sensor chip, which may for example be based on silicon and which comprises a membrane that deforms under the effect of pressure due to the medium 99. As an alternative thereto, the sensor element 1 may for example also comprise a ceramic or metal membrane.

The sensor element 1 is located in a housing 2, which may for example comprise or consist of plastic, metallic and/or ceramic materials. The medium 99 can be fed to the sensor element 1 through a media supply 21, for example in the form of a conduit formed by a connecting piece. As shown by way of example in FIG. 1A, the sensor element 1 may be located in a volume 20 of the housing 2 which is closed by a cover 3. The volume 20 may have a reference pressure, in relation to which the pressure of the medium 99 is measured. As an alternative thereto, it may also be possible for the volume 20 to be open to the surroundings or likewise to be connected to the exhaust gas system, so that the sensor element 1 can measure a corresponding differential pressure. In this case, the surface of the sensor element 1 which faces toward the volume 20, and/or the surfaces of the walls forming the volume 20, and optionally of a supply conduit or media supply, may be configured as or in a similar way as described below for the media supply 21 and the side of the sensor element 1 facing toward the media supply 21. The sensor device 100 is represented in a greatly simplified way in the exemplary embodiment shown, and may comprise further or alternative parts and components conventional for corresponding sensor devices.

The sensor device 100 comprises surfaces 4 which face toward the medium 99 during regular operation. In the exemplary embodiment shown, the surfaces 4 are formed by an inner wall of the media supply 21 and by the side of the sensor element 1 facing toward the media supply 21, in which case the latter side may in particular be formed by the membrane of the sensor element 1. If the temperature in the media supply 21 and/or in the region of the sensor element 1 falls to a sufficiently low value, it may be the case that at least a part of the medium 99 condenses on at least a part of the surfaces 4 or, at even lower temperatures, freezes, which may lead to the problems described in the general part above. In order to avoid this, the sensor device 100 comprises at least one surface 4 with a surface structure 40, which is indicated in a detail in FIG. 1B and which reduces a wettability of the surface 4 with the medium 99 or at least one component contained in the medium 99. In particular, the surface 4 with the surface structure 40 may be superhydrophobic caused by the surface structure 40. This may particularly preferably mean that the contact angle between water and the surface 4 with the surface structure 40 is greater than or equal to 110° or even greater than or equal to 135° or even greater than or equal to 150°. In particular, the superhydrophobic effect of the surface 4 may be caused only by the surface structure 40.

The surface 4 with the surface structure 40 is, in particular, free of a coating that reduces the wetting. In other words, the surface 4 is not formed by a material such as, for example, Teflon or another fluoropolymer, which has been applied deliberately in order to reduce the wettability. Rather, the surface 4 with the surface structure 40 may be a surface of a part or a component of the sensor device 100 which would have a high wettability without the surface structure 40. The material of the surface 4 with the surface structure 40 is therefore, in particular, the material of the corresponding part or of the corresponding component of the sensor device 100 and may, depending on the material from which the part or the component of the sensor device 100 having the surface 4 with the surface structure 40 is made, comprise or be for example a semiconductor material, a metal or a metal alloy, a plastic, a ceramic material or combinations comprising these.

For example, the surface 4 with the surface structure 40 which is indicated in FIG. 1B may be a surface of the sensor element 1. In the exemplary embodiment shown, the surface 4 with the surface structure 40 may particularly preferably be part of the membrane of the sensor element 1. In other words, the surface 4 with the surface structure 40 may be formed by a surface of the membrane facing toward the media supply 21 and therefore toward the medium 99 during operation of the sensor device 100. If the sensor element 1 is a silicon-based chip, the surface with the surface structure may comprise or consist of silicon or an oxide or nitride of silicon. In the case of a ceramic membrane or metal membrane, the surface 4 with the surface structure 40 may correspondingly be a ceramic or metal surface.

As an alternative or in addition, the surface 4 with the surface structure 40 may be at least part of the media supply 21. For example, the surface 4 with the surface structure 40 may be at least a part of the inner wall of the connecting piece shown in FIG. 1A. If the housing 2, and in particular the connecting piece, is made from a ceramic material or a plastic, the surface 4 with the surface structure 40 may correspondingly be a ceramic or plastic surface. In the case of a metal housing 2, the surface 4 with the surface structure 40 may correspondingly also be a metal surface.

Particularly preferably, the entire surface of the sensor device 100 exposed to the medium 99 during operation of the sensor device 100, i.e. all the surfaces 4 exposed to the medium 99 during operation, may also comprise the surface structure 40. Correspondingly, the wettability of all surfaces 4 of the sensor device 100 which come in contact with the medium 99 during operation may be reduced because of the surface structure 40. The advantages described in the general part above may be achievable by the reduced wettability of the surface 4 with the surface structure 40.

The surface structure 40 may comprise a microstructure and/or a nanostructure, i.e. as shown in FIG. 1B it may comprise a multiplicity of elevations 41 and/or depressions 42 in the surface 4, which may have characteristic sizes in the range of greater than or equal to 0.1 μm and less than or equal to 500 μm in the case of a microstructure, and in the range of greater than or equal to 1 nm and less than or equal to 100 nm.

As indicated in FIG. 1C, in order to produce the sensor device, the surface structure is produced by means of pulsed laser radiation, which is indicated by means of the broken arrow with the reference 201. In particular, short-pulse laser irradiation or preferably ultrashort-pulse laser irradiation may be carried out, in particular by using a laser 200, for instance a nanosecond laser or preferably a picosecond laser or particularly preferably a femtosecond laser. This may mean that the pulsed laser radiation 201, which is shone onto the surface 4, comprises laser pulses with a pulse duration of less than or equal to 100 ns or preferably less than or equal to 100 fs or less than or equal to 50 fs or less than or equal to 30 fs.

Parameters of the laser radiation 201, for example selected from wavelength, energy, beam width, fluence, degree of polarization, forward advance rate, pulse frequency, pulse number, pulse duration, angle of incidence and scan conduit offset, may be adjusted depending on the material of the surface 4 in which the surface structure is produced, in order to achieve a desired material ablation in order to generate the surface structure. Furthermore, for example, an interference technique may be used in order to produce periodic microstructures and/or nanostructures.

By the use of the pulsed laser radiation 201, which may correspondingly be adjusted according to the surface material to be processed and the desired surface structure, it may be possible to produce identical or different surface structures on different surfaces, i.e. surfaces of different materials. This may be done during or after the production of a part or a component of the sensor device in an in-line process step. Correspondingly, the pulsed laser irradiation may be carried out as a method step inserted into the conventional production process.

The elevations 41 and/or depressions 42 of the surface structure 40 may, for example, have circular and/or elongate cross sections. For example, the surface structure 40 may comprise circular and/or elliptical elevations and/or depressions, i.e. hole-like depressions and/or hill- or island-like elevations, which may for example be columnar, cylindrical and/or conical in shape. The surface structure 40 may furthermore comprise elongate, branching or non-branching ridges and/or trenches extending along the surface 4, which may intersect or not intersect or be parallel. The elevations 41 and/or depressions 42 may at least partially or all be shaped and/or distributed periodically and therefore regularly, or may at least partially or all be shaped and/or arranged irregularly.

Figure 2A:
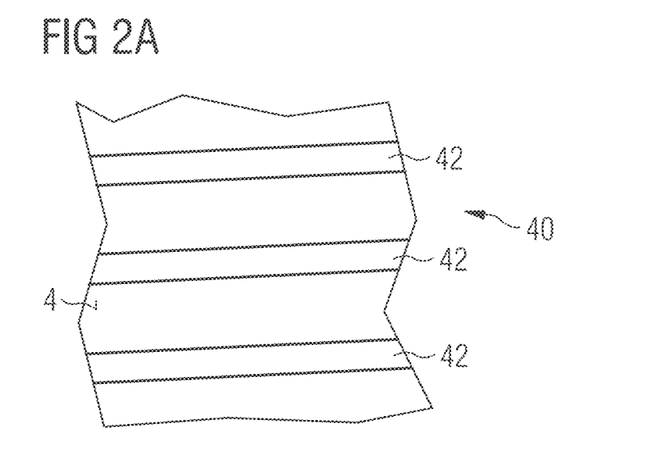
FIGS. 2A to 2C show schematic representations of surface structures of a sensor device according to further exemplary embodiments.
Figure 2B:
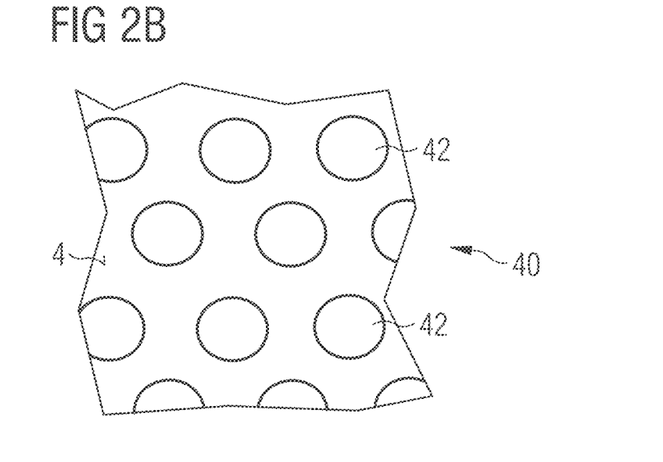
Figure 2C:
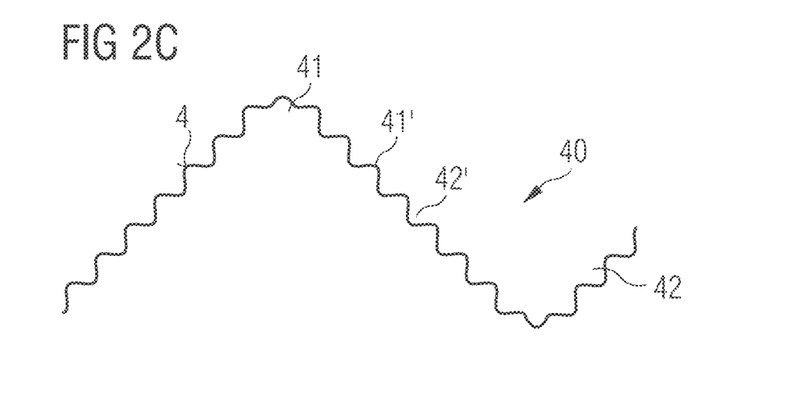

Three exemplary embodiments of the surface structure 40 are shown purely by way of example in FIGS. 2A to 2C. It may, as indicated in FIG. 2A, for example comprise mutually parallel, periodically arranged depressions 42 in the form of channels. As an alternative thereto, the channels may for example also be formed irregularly and/or not straight and/or intersecting. As shown in FIG. 2B, the surface structure 40 may also comprise hole-like depressions 42, for example with a round cross section as shown in FIG. 2B. Furthermore, other shapes as described above and in the general part are possible. Between the depressions 42 shown, the surface 4 may be planar or comprise elevations. Furthermore, it may also be possible for correspondingly shaped elevations 41 to be formed on the surface 4 instead of the depressions 42 shown. As is indicated in FIG. 2C, the surface structure 40 may also comprise a so-called hierarchical micro-nanostructure, i.e. a combination of a microstructure and a nanostructure. To this end, the surface structure 40 may comprise elevations 41 and/or depressions 42, on the surfaces of which nanostructures having corresponding elevations 41' and/or depressions 42' are formed. The characteristic sizes of the surface structures 40 shown may be as described above in the general part. In particular, the shapes and characteristic sizes of the surface structure 40 may be selected in such a way that a sufficiently low wettability is achieved in respect of the medium which is in contact with the surface 4 with the surface structure 40 during operation, in order to reduce or even entirely prevent the problems of the prior art described above and achieve the advantages described above.

Figure 3A:
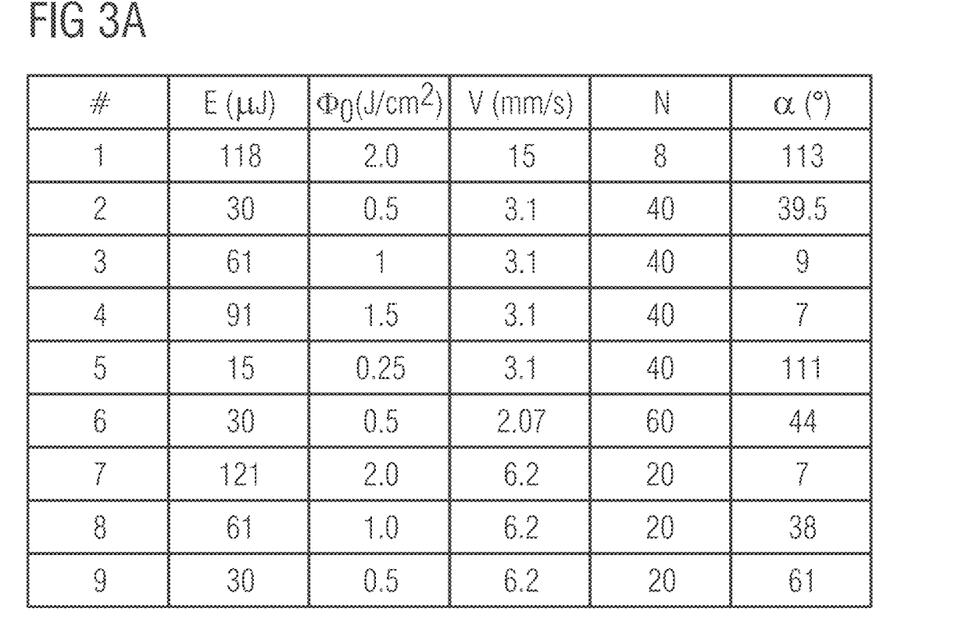
FIGS. 3A and 3B show results of experimental measurements for surface structures produced by means of the method.
Figure 3B:
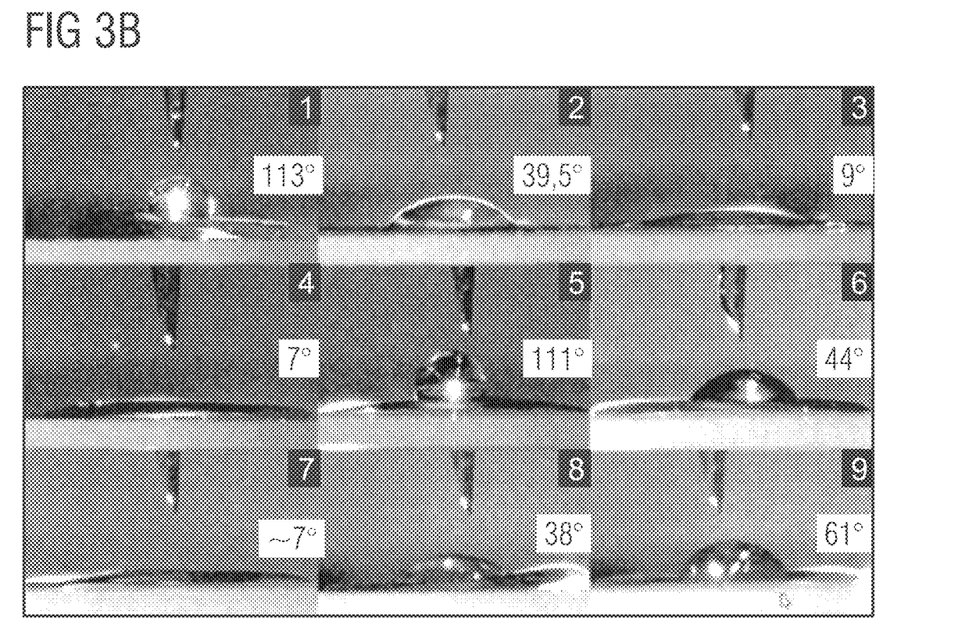

In experimental measurements, surface structures were produced on stainless steel membranes (stainless steel 1.4435) in the manner described. The membranes had a diameter of 12 mm and a thickness of 20 μm, and a surface structure was produced in their respective surface by means of a focused femtosecond laser beam with a pulse duration of 30 fs, a central wavelength of 800 nm and linearly polarized laser light. The parameters of energy E or fluence $\Phi_0$, the forward advance rate V and the pulse number N were in this case varied. In FIG. 3A, these parameters of nine experimental measurements carried out and the contact angle $\alpha$ for water due to the respectively generated surface structure are indicated in a table. In FIG. 3B, corresponding images of water drops are shown, the number respectively in the upper right corner indicating the experiment number # from the table in FIG. 3A and the angle information on the respective right-hand side of the image specifying the contact angle likewise given in the table. From the table and the images, it is clear that the contact angle of a water drop on the membranes depends greatly on the laser parameters selected, and that a pronounced lotus effect can be achieved by a suitable selection of the laser parameters, depending on the material of the surface, as may be seen in the experiments with the numbers 1 and 5.

The features and exemplary embodiments described in connection with the figures may be combined with one another according to further exemplary embodiments, even though not all combinations are explicitly described. Furthermore, the exemplary embodiments described in connection with the figures may as an alternative or in addition comprise further features according to the description in the general part.

By the description of the invention with the aid of the exemplary embodiments, the invention is not restricted to the latter. Rather, the invention comprises any new feature and any combination of features, which in particular includes any combination of features in the patent claims, even if this feature or this combination is not itself explicitly specified in the patent claims or exemplary embodiments.

The invention claimed is:

1. A sensor device comprising:
a sensor element;
a media supply configured to transport a medium to be measured to the sensor element; and
a surface,
wherein the surface is configured to be directly exposed to the medium during operation of the sensor device,
wherein the surface comprises a surface structure configured to reduce a wettability of the surface by the medium,
wherein the surface with the surface structure is free of a coating configured to reduce a wetting, and
wherein the surface comprises different materials.

2. A sensor device comprising:
a sensor element;
a media supply configured to transport a medium to be measured to the sensor element; and
a surface,
wherein the surface is configured to be directly exposed to the medium during operation of the sensor device,
wherein the surface comprises a surface structure configured to reduce a wettability of the surface by the medium,
wherein the surface with the surface structure is free of a coating configured to reduce a wetting, and
wherein the surface is at least a part of the sensor element.

3. A sensor device comprising:
a sensor element comprising a membrane;
a media supply configured to transport a medium to be measured to the sensor element; and
a surface,
wherein the surface is configured to be directly exposed to the medium during operation of the sensor device,
wherein the surface comprises a surface structure configured to reduce a wettability of the surface by the medium,
wherein the surface with the surface structure is free of a coating configured to reduce a wetting, and
wherein the surface is at least a part of the membrane.

4. The sensor device according to claim 3, wherein the surface is hydrophobic or superhydrophobic caused by the surface structure.

5. The sensor device according to claim 3, wherein the surface structure comprises a microstructure.

6. The sensor device according to claim 5, wherein the microstructure comprises elevations and/or depressions having circular and/or elongate cross sections.

7. The sensor device according to claim 6, wherein the elevations and/or the depressions have a spacing of less than or equal to 500 µm.

8. The sensor device according to claim 6, wherein the elevations and/or the depressions have a height or a depth of less than or equal to 250 µm.

9. The sensor device according to claim 3, wherein the surface structure comprises a nanostructure.

10. The sensor device according to claim 3, wherein the surface structure comprises a hierarchical micro-nanostructure.

11. The sensor device according to claim 3, wherein the surface is at least part of the media supply.

12. The sensor device according to claim 11, wherein the surface is at least a part of a channel, of a conduit and/or of a storage volume for the medium.

13. The sensor device according to claim 3, wherein the sensor device is a pressure sensor.

14. The sensor device according to claim 3, wherein an entire surface comprises the surface structure.

15. The sensor device according to claim 3, wherein the surface is at least partially a metal surface.

16. The sensor device according to claim 3, wherein the surface comprises different materials.

17. The sensor device according to claim 3, wherein the surface is free of a material having a lower wettability in comparison with an uncoated surface.

18. A method for producing the sensor device according to claim 3, the method comprising:
producing the surface structure by pulsed laser radiation.

19. The method according to claim 18, wherein the pulsed laser radiation comprises laser pulses with a pulse duration of less than or equal to 100 ns.

* * * * *